(12) United States Patent
Frampton et al.

(10) Patent No.: US 11,567,655 B2
(45) Date of Patent: Jan. 31, 2023

(54) SECURE SIGNATURE CREATION ON A SECONDARY DEVICE

(71) Applicant: Acorns Grow Incorporated, Irvine, CA (US)

(72) Inventors: Robert Frampton, Anaheim, CA (US); Russell Cloak, Huntington Beach, CA (US)

(73) Assignee: Acorns Grow Incorporated, Irvine, CA (US)

( * ) Notice: Subject to any disclaimer, the term of this patent is extended or adjusted under 35 U.S.C. 154(b) by 0 days.

(21) Appl. No.: 16/796,722

(22) Filed: Feb. 20, 2020

(65) Prior Publication Data
US 2020/0272323 A1 Aug. 27, 2020

Related U.S. Application Data

(60) Provisional application No. 62/808,695, filed on Feb. 21, 2019.

(51) Int. Cl.
*G06F 3/04883* (2022.01)
*G06F 3/14* (2006.01)
(Continued)

(52) U.S. Cl.
CPC ...... *G06F 3/04883* (2013.01); *G06F 3/04842* (2013.01); *G06F 3/14* (2013.01);
(Continued)

(58) Field of Classification Search
CPC ............ G06F 3/0488; G06F 3/04883; G06F 3/04842; G06F 3/0482; G06F 3/14;
(Continued)

(56) References Cited

U.S. PATENT DOCUMENTS 3,573,747 A 4/1971 Adams et al.
4,108,361 A 8/1978 Krause
(Continued)

FOREIGN PATENT DOCUMENTS

EP 3 079 326 A1 10/2016
GB 2300742 A * 11/1996 ......... G06K 9/00154
(Continued)

OTHER PUBLICATIONS

"Aggregate Transaction Data." *Plaid*, (Sep. 22, 2015). https://plaid.com/solutions/transaction-data/. Web. Accessed on Apr. 20, 2017. 5 pages.

(Continued)

*Primary Examiner* — Reza Nabi
*Assistant Examiner* — Hwei-Min Lu
(74) *Attorney, Agent, or Firm* — Knobbe, Martens, Olson & Bear, LLP

(57) ABSTRACT

Methods and systems for acquiring a freehand or cursive signature on a secondary device with a touch receiving surface for use on a primary device without a touch receiving surface are provided. The primary device sends a message to the secondary device requesting a signature. The user responds by signing her name, using a finger or stylus, on a touch receiving surface. As the user signs her name, the signature is displayed on the secondary device and transmitted to the primary device. The signature may then be stored, displayed, analyzed, or validated by the primary device.

10 Claims, 10 Drawing Sheets

(51) Int. Cl.
  *G06V 40/30* (2022.01)
  *G06F 21/32* (2013.01)
  *G06F 3/04842* (2022.01)
  *G06K 9/62* (2022.01)

(52) U.S. Cl.
  CPC ........... *G06F 21/32* (2013.01); *G06K 9/6201* (2013.01); *G06V 40/33* (2022.01)

(58) Field of Classification Search
  CPC ............... G06F 21/32; G06K 9/00161; G06K 9/00154; G06K 9/00167; G06K 9/6201
  USPC ........................................ 715/748, 268, 541
  See application file for complete search history.

(56) References Cited

U.S. PATENT DOCUMENTS

| | | |
|---|---|---|
| 4,750,119 A | 6/1988 | Cohen et al. |
| 4,751,640 A | 6/1988 | Lucas et al. |
| 4,882,473 A | 11/1989 | Bergeron et al. |
| 5,202,826 A | 4/1993 | McCarthy |
| 5,205,826 A | 4/1993 | Chen et al. |
| 5,297,026 A | 3/1994 | Hoffman |
| 5,483,444 A | 1/1996 | Heintzeman et al. |
| 5,513,102 A | 4/1996 | Auriemma |
| 5,537,314 A | 7/1996 | Kanter |
| 5,621,640 A | 4/1997 | Burke |
| 5,689,100 A | 11/1997 | Carrithers et al. |
| 5,734,838 A | 3/1998 | Robinson et al. |
| 5,774,870 A | 6/1998 | Storey |
| 5,787,404 A | 7/1998 | Fernandez-Holmann |
| 5,890,963 A | 4/1999 | Yen |
| 5,970,480 A | 10/1999 | Kalina |
| 5,991,736 A | 11/1999 | Ferguson et al. |
| 6,070,153 A | 5/2000 | Simpson |
| 6,076,166 A | 6/2000 | Moshfeghi et al. |
| 6,088,682 A | 7/2000 | Burke |
| 6,105,865 A | 8/2000 | Hardesty |
| 6,112,191 A | 8/2000 | Burke |
| 6,164,533 A | 12/2000 | Barton |
| 6,598,028 B1 | 7/2003 | Sullivan et al. |
| D480,401 S | 10/2003 | Kahn et al. |
| 6,876,971 B1 | 4/2005 | Burke |
| 6,876,978 B1 | 4/2005 | Walker et al. |
| 6,912,509 B1 | 6/2005 | Lear |
| 6,941,279 B1 | 9/2005 | Sullivan |
| 7,028,827 B1 | 4/2006 | Molbak et al. |
| 7,264,153 B1 | 9/2007 | Burke |
| D570,361 S | 6/2008 | Lam et al. |
| D577,364 S | 9/2008 | Flynt et al. |
| 7,502,758 B2 | 3/2009 | Burke |
| 7,571,849 B2 | 8/2009 | Burke |
| 7,574,403 B2 | 8/2009 | Webb et al. |
| D600,703 S | 9/2009 | LaManna et al. |
| D610,161 S | 2/2010 | Matas |
| 7,765,147 B2 | 7/2010 | Khoury |
| 7,831,494 B2 | 11/2010 | Sloan et al. |
| D636,398 S | 4/2011 | Matas |
| 8,025,217 B2 | 9/2011 | Burke |
| D652,048 S | 1/2012 | Joseph |
| D652,053 S | 1/2012 | Impas et al. |
| 8,195,576 B1 | 6/2012 | Grigg et al. |
| 8,234,188 B1 | 7/2012 | Phillips et al. |
| D665,407 S | 8/2012 | Bitran et al. |
| 8,255,329 B1 | 8/2012 | Barth et al. |
| 8,301,530 B2 | 10/2012 | Carretta et al. |
| 8,370,243 B1 | 2/2013 | Cernyar |
| D677,274 S | 3/2013 | Phelan |
| D677,326 S | 3/2013 | Gleasman et al. |
| D680,128 S | 4/2013 | Seo |
| 8,416,924 B1 | 4/2013 | Barth et al. |
| D682,311 S | 5/2013 | Voreis et al. |
| D694,252 S | 11/2013 | Helm |
| D694,253 S | 11/2013 | Helm |
| 8,583,515 B2 | 11/2013 | Sorbe et al. |
| D695,766 S | 12/2013 | Tagliabue et al. |
| D696,268 S | 12/2013 | Hyunjung et al. |
| D696,273 S | 12/2013 | Tagliabue et al. |
| D696,275 S | 12/2013 | Tagliabue et al. |
| 8,732,089 B1 | 5/2014 | Fang et al. |
| 8,781,906 B2 | 7/2014 | Cruttenden et al. |
| 8,791,949 B1 | 7/2014 | Mackrell et al. |
| D714,327 S | 9/2014 | Wood |
| D715,833 S | 10/2014 | Rebstock |
| D716,344 S | 10/2014 | Anzures |
| D716,820 S | 11/2014 | Wood |
| D720,765 S | 1/2015 | Xie et al. |
| D722,075 S | 2/2015 | Zhang et al. |
| D723,580 S | 3/2015 | Yoon et al. |
| D725,664 S | 3/2015 | Nies et al. |
| D727,941 S | 4/2015 | Angelides |
| D727,958 S | 4/2015 | Ray et al. |
| D732,562 S | 6/2015 | Yan et al. |
| D735,228 S | 7/2015 | Lim |
| D736,808 S | 8/2015 | Soegiono et al. |
| D744,501 S | 12/2015 | Wilberding et al. |
| D744,520 S | 12/2015 | McLaughlin et al. |
| D745,050 S | 12/2015 | Kwon |
| D747,351 S | 1/2016 | Lee |
| D747,726 S | 1/2016 | Virk et al. |
| 9,244,601 B2 | 1/2016 | Kim et al. |
| D751,568 S | 3/2016 | Kim et al. |
| D753,155 S | 4/2016 | Nies et al. |
| D754,707 S | 4/2016 | Zurn |
| D757,073 S | 5/2016 | Kim |
| D760,759 S | 7/2016 | Butcher et al. |
| D762,701 S | 8/2016 | Apodaca et al. |
| D763,284 S | 8/2016 | Edman |
| D763,285 S | 8/2016 | Chan et al. |
| D763,886 S | 8/2016 | Riekes et al. |
| D767,612 S | 9/2016 | Hemsley |
| D770,515 S | 11/2016 | Cho et al. |
| D772,910 S | 11/2016 | Baker et al. |
| D773,478 S | 12/2016 | Wesley et al. |
| D773,503 S | 12/2016 | Kim |
| D775,184 S | 12/2016 | Song et al. |
| D778,301 S | 2/2017 | Toda |
| D782,504 S | 3/2017 | Lee et al. |
| D785,022 S | 4/2017 | Vazquez et al. |
| D785,640 S | 5/2017 | Cruttenden et al. |
| D786,896 S | 5/2017 | Kim et al. |
| D789,956 S | 6/2017 | Ortega et al. |
| D789,968 S | 6/2017 | Mensinger et al. |
| D792,890 S | 7/2017 | Cruttenden et al. |
| 9,734,536 B2 | 8/2017 | Cruttenden et al. |
| 9,747,597 B2 | 8/2017 | Wu |
| D799,540 S | 10/2017 | Eder |
| D800,171 S | 10/2017 | Hemsley |
| D801,378 S | 10/2017 | Sachtleben et al. |
| D802,607 S | 11/2017 | Apodaca et al. |
| 9,830,648 B2 | 11/2017 | Kanjlia et al. |
| D804,522 S | 12/2017 | Sachtleben et al. |
| 9,836,736 B1 | 12/2017 | Neale et al. |
| 9,842,321 B2 | 12/2017 | Johnston et al. |
| D806,735 S | 1/2018 | Olsen et al. |
| D808,403 S | 1/2018 | Capela et al. |
| D809,545 S | 2/2018 | Ban et al. |
| D811,426 S | 2/2018 | Trahan et al. |
| D812,087 S | 3/2018 | Zimmerman et al. |
| D814,483 S | 4/2018 | Gavaskar et al. |
| D815,119 S | 4/2018 | Chalker et al. |
| D815,121 S | 4/2018 | Cruttenden et al. |
| D818,480 S | 5/2018 | Ricky et al. |
| D821,424 S | 6/2018 | Von Reden |
| 9,990,642 B2 | 6/2018 | Strock et al. |
| D822,034 S | 7/2018 | Clymer et al. |
| D830,376 S | 10/2018 | Naghdy et al. |
| D831,681 S | 10/2018 | Eilertsen |
| D831,687 S | 10/2018 | Varshavskaya et al. |
| D832,863 S | 11/2018 | Cruttenden et al. |
| D834,595 S | 11/2018 | Cruttenden et al. |
| D835,658 S | 12/2018 | Chan et al. |
| 10,157,420 B2 | 12/2018 | Narayana et al. |
| D837,235 S | 1/2019 | Meng |

(56) References Cited

U.S. PATENT DOCUMENTS

| | | |
|---|---|---|
| D837,240 S | 1/2019 | Van Tricht |
| D838,278 S | 1/2019 | McGlasson et al. |
| D838,289 S | 1/2019 | Stray et al. |
| D839,880 S | 2/2019 | Dudey |
| D840,420 S | 2/2019 | Chalker et al. |
| D841,024 S | 2/2019 | Clediere et al. |
| D841,044 S | 2/2019 | van den Berg et al. |
| D841,047 S | 2/2019 | Papolu et al. |
| D847,169 S | 4/2019 | Sombreireiro et al. |
| D849,770 S | 5/2019 | Matas |
| D850,481 S | 6/2019 | Huh et al. |
| D851,117 S | 6/2019 | Kuklinski |
| D852,216 S | 6/2019 | Westerhold et al. |
| D853,412 S | 7/2019 | Hofner et al. |
| D853,413 S | 7/2019 | Hofner et al. |
| D855,633 S | 8/2019 | Wei et al. |
| D855,634 S | 8/2019 | Kim |
| D855,641 S | 8/2019 | Lewis et al. |
| D855,650 S | 8/2019 | Wesdorp-Jansen et al. |
| D858,555 S | 9/2019 | Krishna |
| D859,446 S | 9/2019 | Westerhold et al. |
| D861,705 S | 10/2019 | Inose et al. |
| D864,230 S | 10/2019 | Gupta |
| D864,231 S | 10/2019 | Gupta |
| D866,572 S | 11/2019 | Sagrillo et al. |
| D869,488 S | 12/2019 | Storr |
| D870,129 S | 12/2019 | Bhardwaj et al. |
| D870,759 S | 12/2019 | Westerhold et al. |
| D871,431 S | 12/2019 | Cullum et al. |
| D871,432 S | 12/2019 | Robinson et al. |
| D871,433 S | 12/2019 | Rondon et al. |
| D874,480 S | 2/2020 | Christie et al. |
| D875,115 S | 2/2020 | Yan |
| D875,743 S | 2/2020 | Cielak et al. |
| D875,756 S | 2/2020 | Feng et al. |
| D876,457 S | 2/2020 | Stoeckle et al. |
| D876,458 S | 2/2020 | Han et al. |
| D876,462 S | 2/2020 | Li et al. |
| D877,162 S | 3/2020 | Hanson |
| D879,803 S | 3/2020 | Corona et al. |
| D880,512 S | 4/2020 | Greenwald et al. |
| D880,521 S | 4/2020 | Dye et al. |
| D883,321 S | 5/2020 | Clymer et al. |
| D883,324 S | 5/2020 | Mollinga |
| D886,135 S | 6/2020 | Cheng et al. |
| D886,137 S | 6/2020 | Kaminer et al. |
| D890,810 S | 7/2020 | Smith et al. |
| D892,143 S | 8/2020 | Dascola et al. |
| D892,148 S | 8/2020 | Silcock et al. |
| D892,149 S | 8/2020 | Silcock et al. |
| D893,519 S | 8/2020 | Aketa et al. |
| D894,206 S | 8/2020 | Naruns et al. |
| D898,757 S | 10/2020 | Navasca |
| D902,249 S | 11/2020 | Lee et al. |
| D904,450 S | 12/2020 | Jacoby et al. |
| D911,372 S | 2/2021 | Zhao et al. |
| D911,375 S | 2/2021 | Zhao et al. |
| D912,695 S | 3/2021 | Zhao et al. |
| D913,304 S | 3/2021 | VanDuyn et al. |
| D914,039 S | 3/2021 | Zimmerman et al. |
| D914,712 S | 3/2021 | Cielak et al. |
| D914,721 S | 3/2021 | Porter et al. |
| D915,434 S | 4/2021 | Yurchenkov |
| 2002/0042742 A1 | 4/2002 | Glover et al. |
| 2002/0046124 A1 | 4/2002 | Alderucci et al. |
| 2002/0052818 A1 | 5/2002 | Loveland |
| 2002/0062272 A1 | 5/2002 | Kim et al. |
| 2002/0123954 A1 | 9/2002 | Hito |
| 2002/0138383 A1 | 9/2002 | Rhee |
| 2002/0156722 A1 | 10/2002 | Greenwood |
| 2002/0198799 A1 | 12/2002 | Burden |
| 2003/0050889 A1 | 3/2003 | Burke |
| 2003/0074311 A1 | 4/2003 | Saylors et al. |
| 2003/0083930 A1 | 5/2003 | Burke |
| 2003/0093353 A1 | 5/2003 | Ward et al. |
| 2003/0125108 A1 | 7/2003 | Groz |
| 2003/0149629 A1 | 8/2003 | Claridge et al. |
| 2003/0163404 A1 | 8/2003 | Hu et al. |
| 2003/0191711 A1 | 10/2003 | Jamison et al. |
| 2003/0200163 A1 | 10/2003 | O'Riordan et al. |
| 2003/0225649 A1 | 12/2003 | Simpson |
| 2004/0222285 A1 | 11/2004 | Pohl |
| 2004/0243498 A1 | 12/2004 | Duke |
| 2005/0044038 A1 | 2/2005 | Whiting et al. |
| 2006/0036523 A1 | 2/2006 | Stover et al. |
| 2006/0047589 A1 | 3/2006 | Grau |
| 2007/0011089 A1 | 1/2007 | DeSchryver |
| 2007/0033134 A1 | 2/2007 | Carretta et al. |
| 2007/0034688 A1 | 2/2007 | Burke |
| 2007/0043666 A1 | 2/2007 | Burdette |
| 2007/0061252 A1 | 3/2007 | Burke |
| 2007/0094130 A1 | 4/2007 | Burke |
| 2007/0157105 A1 | 7/2007 | Owens et al. |
| 2007/0167219 A1 | 7/2007 | Groz |
| 2007/0294158 A1 | 12/2007 | Patel et al. |
| 2008/0010201 A1 | 1/2008 | Pratt et al. |
| 2008/0065532 A1 | 3/2008 | De La Motte |
| 2008/0162377 A1 | 7/2008 | Pinkas |
| 2008/0249957 A1 | 10/2008 | Masuyama et al. |
| 2008/0255951 A1 | 10/2008 | Miller et al. |
| 2008/0288398 A1 | 11/2008 | Maricondi |
| 2009/0089104 A1 | 4/2009 | Kondaks |
| 2009/0106161 A1 | 4/2009 | Alemany |
| 2009/0150284 A1 | 6/2009 | Burke |
| 2009/0150286 A1 | 6/2009 | Barton |
| 2009/0177564 A1 | 7/2009 | Burke |
| 2009/0181777 A1 | 7/2009 | Christiani et al. |
| 2009/0198625 A1 | 8/2009 | Walker et al. |
| 2009/0204503 A1 | 8/2009 | Hursta |
| 2009/0204528 A1 | 8/2009 | Moses |
| 2009/0215537 A1 | 8/2009 | Poff |
| 2009/0318220 A1 | 12/2009 | Arezina et al. |
| 2010/0005034 A1 | 1/2010 | Carpenter et al. |
| 2010/0005035 A1 | 1/2010 | Carpenter et al. |
| 2010/0121723 A1 | 5/2010 | Miller et al. |
| 2010/0124986 A1 | 5/2010 | Van Luchene |
| 2010/0250436 A1 | 9/2010 | Loevenguth et al. |
| 2011/0125637 A1 | 5/2011 | Kalra et al. |
| 2011/0137913 A1 | 6/2011 | Bhatti et al. |
| 2011/0307318 A1 | 12/2011 | LaPorte et al. |
| 2012/0116992 A1 | 5/2012 | Tuchman |
| 2012/0123849 A1 | 5/2012 | Armstrong |
| 2012/0173454 A1 | 7/2012 | Shah et al. |
| 2012/0231878 A1 | 9/2012 | Angelo |
| 2012/0233089 A1 | 9/2012 | Calman et al. |
| 2012/0233090 A1 | 9/2012 | Tavares et al. |
| 2012/0259762 A1 | 10/2012 | Tarighat et al. |
| 2013/0013530 A1 | 1/2013 | Nowacki |
| 2013/0111600 A1* | 5/2013 | Guenther ............... G06F 21/72 726/26 |
| 2013/0138577 A1 | 5/2013 | Sisk |
| 2013/0166476 A1 | 6/2013 | Samson |
| 2013/0187780 A1 | 7/2013 | Angelides |
| 2013/0198108 A1 | 8/2013 | Walia et al. |
| 2013/0332388 A1 | 12/2013 | Martell et al. |
| 2014/0040121 A1 | 2/2014 | Robb et al. |
| 2014/0052594 A1 | 2/2014 | Zimmer et al. |
| 2014/0098030 A1* | 4/2014 | Tang ................. G06F 3/04142 345/173 |
| 2014/0180790 A1 | 6/2014 | Boal |
| 2014/0180793 A1 | 6/2014 | Boal |
| 2014/0180806 A1 | 6/2014 | Boal |
| 2014/0180826 A1 | 6/2014 | Boal |
| 2014/0189608 A1 | 7/2014 | Shuttleworth et al. |
| 2014/0223313 A1 | 8/2014 | Aebi |
| 2014/0223347 A1 | 8/2014 | Seo et al. |
| 2014/0279185 A1 | 9/2014 | Merz et al. |
| 2014/0281946 A1* | 9/2014 | Avni ................. G06V 40/388 726/4 |
| 2014/0282222 A1 | 9/2014 | Eim et al. |
| 2014/0283005 A1* | 9/2014 | Avni ................. G06F 21/32 726/16 |
| 2015/0066792 A1 | 3/2015 | Sprague |
| 2015/0067598 A1 | 3/2015 | Yoo et al. |

(56) References Cited

U.S. PATENT DOCUMENTS

| | | | |
|---|---|---|---|
| 2015/0081458 | A1 | 3/2015 | Cruttenden et al. |
| 2015/0120425 | A1 | 4/2015 | Caldwell |
| 2015/0134509 | A1 | 5/2015 | Martin et al. |
| 2015/0339280 | A1* | 11/2015 | McLaughlin .......... G06F 21/64 726/16 |
| 2016/0012392 | A1* | 1/2016 | Paden ............... G06Q 10/0838 705/341 |
| 2016/0124609 | A1 | 5/2016 | Covington et al. |
| 2016/0224528 | A1* | 8/2016 | Trevarthen .......... G06F 3/04883 |
| 2016/0259413 | A1 | 9/2016 | Anzures et al. |
| 2016/0266724 | A1 | 9/2016 | Plumb-Larrick et al. |
| 2016/0321214 | A1* | 11/2016 | Hickey ................. G06F 40/169 |
| 2016/0335479 | A1* | 11/2016 | Bartlett, II ............ H04L 67/146 |
| 2017/0011406 | A1 | 1/2017 | Tunnell et al. |
| 2017/0272249 | A1* | 9/2017 | Bhandarkar .......... H04L 9/3247 |
| 2017/0345098 | A1 | 11/2017 | Cruttenden et al. |
| 2018/0227370 | A1* | 8/2018 | Robles ............... G06Q 20/4014 |
| 2018/0364665 | A1 | 12/2018 | Clymer et al. |
| 2019/0095064 | A1 | 3/2019 | Alexander |
| 2019/0146639 | A1 | 5/2019 | Sarode et al. |
| 2019/0237189 | A1 | 8/2019 | Geller et al. |
| 2020/0077483 | A1 | 3/2020 | Agarwal et al. |
| 2020/0159871 | A1 | 5/2020 | Bowen |
| 2020/0258176 | A1* | 8/2020 | Gibson ................ G06Q 10/083 |
| 2020/0301575 | A1 | 9/2020 | Lindholm et al. |
| 2020/0304626 | A1 | 9/2020 | Phillips et al. |
| 2020/0393952 | A1 | 12/2020 | Hsiao |

FOREIGN PATENT DOCUMENTS

| | | |
|---|---|---|
| WO | WO-96/34358 A1 | 10/1996 |
| WO | WO-2011/103520 A1 | 8/2011 |

OTHER PUBLICATIONS

"Robinhood.com" Robinhood.com, 2014. Web Aug. 23, 2016. 5 pages. <<https://www.robinhood.com/>>.

"The Complete Guide to Account Aggregation." *BlueLeaf*, (Jul. 24, 2014). https://www.blueleaf.com/what-is-account-aggregation/. Web. Accessed on Apr. 20, 2017. 10 pages.

Acorns App Wants To Invest Your Spare Change [online], Direkt Concept., Jun. 18, 2014. 2 pages. [Retrieved on Mar. 15, 2016]. Retrieved from the Internet< http://www.direktconcept.com/2014/06/18/acorns-app-wants-to-invest-spare-change/ >.

Acorns Is A Micro-Investment App That Does All The Thinking For You [online]. Techcrunch, Aug. 26, 2014. 6 pages. [Retrieved on Mar. 15, 2016]. Retrieved from the Internet< http://techcrunch.com/2014/08/26/acorns-is-a-micro-investment-app-that-does-all-the-thinking-for-you/ >.

Acorns Review [online]. 148Apps, Oct. 6, 2014. 18 pages. [Retrieved on Mar. 15, 2016]. Retrieved from the Internet< http://www.148apps.com/reviews/acorns-review-3/>.

Constine, Josh. 'Robinhood Raises $13M To Democratize Stock Market With Zero-Commission Trading App'. techcrunch.com [online]. Sep. 23, 2014 [retrieved Aug. 25, 2016]. 11 pages. Retrieved from the Internet: <URL: https://techcrunch.com/2014/09/23/robinhood-stock-app/>.

Specification filed Mar. 20, 2000 in U.S. Appl. No. 09/531,412, related application data for U.S. Pat. No. 7,574,403 (Year: 2000). 69 pages.

International Search Report and Written Opinion issued in International Application No. PCT/US18/64100, dated Feb. 21, 2019. 14 pages.

Martin, James A. Good Ol' Piggy Bank Better for Saving Cash Than 'Acorns' Android, iOS Apps. *Dribbble*, Oct. 17, 2014. 5 pages. [Retrieved on Dec. 27, 2017]. Retrieved from the Internet<https://www.cio.com/article/2834493/mobile-apps/ good-ol-piggy-bank-better-for-saving-cash-than-acorns-android-ios-apps.html>(Year: 2014).

Newsweek: Cover story: 'Technology: What You'll Want Next'. (May 23, 1999). PR Newswire. 15 pages. Retrieved from http://search.proquest.com/docview/449709031?accountid=14753. Retrieved on Mar. 29, 2016.

Sheridan, Trevor. App Of The Day: Nice Weather 2—A Sunny Overview Of The Weather. applenapps.com [online]. Oct. 28, 2013 [Retrieved Aug. 25, 2016]. 4 pages. Retrieved from the Internet: <URL: http://applenapps.com/app-pick/app-of-the-day-nice-weather-2-a-sunny-overview-of-the-weather.html>.

Spaceboy88. "Hide/Remove songs from Followed Playlist." [Online]. Spotify Community. Jul. 14, 2014. 6 pages. [Retrieved on Dec. 27, 2017]. Retrieved from the Internet<https://community.spotify.com/t5/Closed-Ideas/Hide-Remove-songs-from-Followed-Playlist/idi-p/856303> (Year: 2014).

Symons, A. (1998). "Making the connection through technology." Drug Store News, 20(20), 57-57, 107+. 4 pages. Retrieved from http://search.proquest.com/docview/204728199?accountid=14753. Retrieved on Mar. 29, 2016.

Szathmary, Zoe. "Investing in the palm of your hand: New smartphone app Acorns automatically rounds users' purchases to the next dollar so change can be put into a portfolio." *The Daily Mail*, Sep. 9, 2014. 4 pages. [Retrieved on Dec. 27, 2017]. Retrieved from the Internet:<http://www.dailymail.co.uk/news/article-2749738/ Investing-palm-hand-New-smartphone-app-Acorns-automatically-rounds-users-purchases-dollar-change-portfolio.html> (Year: 2014).

The Banker. "Check Out This Acorns Thing." *Bankers Anonymous*, Jun. 14, 2016. 6 pages. [Retrieved on Dec. 27, 2017]. Retrieved from the Internet < http://www.bankers-anonymous.com/blog/check-out-this-acorns-thing/> (Year: 2016).

Frank, Blair. "App of the Week: Acorns invests the spare change from your everyday purchases." GeekWire, published Feb. 4, 2015 (Retrieved from the Internet Jun. 1, 2020). Internet URL: <https://www.geekwire.com/2015/ app-week-acorns-invests-spare-change-everyday-purchases/> (Year: 2015). 1 page.

Ping, Jonathan. "Acorns App Review: Auto-Invest Your Spare Change, Now Free for Students." My Money Blog, published Mar. 4, 2016 (Retrieved from the Internet Jun. 1, 2020). Internet URL: <https://web.archive.org/web/20160304165939/https://www.nnynnoneyblog.conn/acorns-app-review.htnnl> (Year: 2016). 2 pages.

Revell, Jonathan. "Acorns: Just nuts, or a good investment?" The Blog of Jonathan Revell, published Sep. 4, 2014 (Retrieved from the Internet Jun. 1, 2020). Internet URL: <https://blog.jonathanrevell.conn/acorns-just-nuts-or-a-good-investment/> (Year: 2014). 11 pages.

Yogesh. "Creating a line slider on a graph in android." Stack Overflow, published Apr. 20, 2015 (Retrieved from the Internet Jun. 2, 2020). Internet URL: <https://stackoverflow.conn/questions/29743092/creating-a-line-slider-on-a-graph-in-android> (Year: 2015). 1 page.

Acorns—Invest, Earn, Grow, Spend, Later, acorns.com [online], available by Sep. 4, 2014 as verified byWayback Machine®, [retrieved on Feb. 10, 2021], retrieved from the Internet <URL: https://web.archive.org/web/20140904101831/https://www.acorns.com/> (Year: 2014). 5 pages.

Acorns App Makes You a Better Saver, by Bozzo, smartphone. gadgethacks.com [online], published on Oct. 14, 2014, [retrieved on Feb. 11, 2021], retrieved from the Internet <URL: https://smartphones.gadgethacks.com/how-to/acorns-app-makes-you-better-saver-without-you-even-noticing-0157807/> (Year: 2014). 1 page.

Remote Control Relay, apkpure.com [online], published on Jan. 20, 2016, [retrieved on Oct. 21, 2020], retrieved from the Internet <URL: https://apkpure.conn/rennote-control-relay/conn.androidreann.rennotecontrolrelay> (Year: 2016). 2 pages.

Duncan, Shelli. "Planting Acorns: When It Comes to Investing, Small Steps Can Yield Big Rewards." Modern hygienist 3.9 (2007): 44-. Print. (Year: 2007) 5 pages.

Golio, Mike. "Live Below Your Means (LBYM)," in Engineering Your Retirement: Retirement Planning for Technology Professionals, IEEE, 2006, pp. 45-69, doi: 10.1002/9780470112472.ch3. (Year: 2006).

Golio, Mike. "Your Investment Plan," in Engineering Your Retirement: Retirement Planning for Technology Professionals, IEEE, 2006, pp. 115-148, doi: 10.1002/9780470112472.ch6. (Year: 2006).

* cited by examiner

SECURE SIGNATURE CREATION ON A SECONDARY DEVICE

TECHNICAL FIELD

Systems and methods for securely signing a freehand or cursive signature on a secondary device are provided.

BACKGROUND

Signing a freehand or cursive signature using a mouse or similar desktop input device may be cumbersome, and result in a distorted or unrecognizable signature. However, secondary devices, such as a smart phone or tablet may be equipped with a touch screen or stylus input that allows easy touch or stylus input, enabling entry of clear and accurate signatures. There is a need for users to be able to enter clear and accurate signatures when working on a first device that does not have a touch screen, stylus, or similar input device by securely signing on a secondary device equipped with a touch screen or electronic stylus.

SUMMARY

Methods and systems for securely entering a signature on a secondary device via touch or stylus input, while operating a primary device are provided.

One aspect is a method for acquiring a signature. The method includes sending, by a primary device, a message to a secondary device requesting a signature. The secondary device includes a touch receiving surface configured to receive touch input. The method further includes receiving, by the primary device, an identifier generated by a sync server. The identifier identifies a private connection for exchanging data between the primary device and the secondary device. The method further includes receiving, via the private connection, by the primary device from the secondary device, data points corresponding to at least portions of the signature received via touch input by the touch receiving surface on the secondary device. The method further includes storing, by the primary device, the signature.

In various embodiments, sending the message to the secondary device includes sending the message via a text message. In various embodiments, the method further includes receiving portions of the signature as the signature is received via touch input by the touch receiving surface. In various embodiments, the method further includes displaying the received at least portions of the signature on the primary device. In various embodiments, the method further includes validating the received at least portions of the signature by comparing the received at least portions of the signature to a previously signed signature. In various embodiments, the method further includes receiving, via the private connection, by the primary device from the secondary device, a confirmation of signature message. In various embodiments, the method further includes receiving, via the private connection, by the primary device from the secondary device, a clear signature message.

Another aspect is a method for acquiring a signature. The method includes receiving, by a secondary device, a message from a primary device requesting a signature. The secondary device includes a touch receiving surface configured to receive touch input. The method further includes receiving, by the secondary device, an identifier generated by a sync server. The identifier identifies a private connection for exchanging data between the primary device and the secondary device. The method further includes displaying, by the secondary device, a web page corresponding to a universal record locator (URL) generated by the sync server. The web page includes a region for entering a signature via touch input on the touch receiving surface. The method further includes receiving, by the secondary device, touch input on the touch receiving surface corresponding to at least portions of the signature. The method further includes sending, via the private connection, by the secondary device to the primary device, data points corresponding to at least portions of the signature received via touch input by the touch receiving surface.

In various embodiments, receiving the message from the secondary device includes receiving the message via a text message. In various embodiments, the method further includes sending portions of the signature as the signature is received via touch input by the touch receiving surface. In various embodiments, the method further includes displaying the portions of the signature on the secondary device. In various embodiments, the method further includes sending, via the private connection, by the secondary device to the primary device, a confirmation of signature message in response to a user selection of a confirm signature button. In various embodiments, the method further includes sending, via the private connection, by the secondary device to the primary device, a clear signature message in response to a user selection of a clear button. In various embodiments, the touch receiving surface comprises at least one of a resistive, surface capacitive, projective capacitive, surface acoustic wave, and infrared touch technology.

Another aspect is a non-transitory computer program product storing instructions that, when executed by at least one programmable processor, cause the at least one programmable processor to perform operations for acquiring a signature. The operations include sending, by a primary device, a message to a secondary device requesting a signature, the secondary device comprising a touch receiving surface configured to receive touch input. The operations further include receiving, by the primary device, an identifier generated by a sync server. The identifier identifies a private connection for exchanging data between the primary device and the secondary device. The operations further include receiving, via the private connection, by the primary device from the secondary device, data points corresponding to at least portions of the signature received via touch input by the touch receiving surface by the secondary device. The operations further include storing, by the primary device, the signature.

Another aspect is a non-transitory computer program product storing instructions that, when executed by at least one programmable processor, cause the at least one programmable processor to perform operations for acquiring a signature. The operations include receiving, by a secondary device, a message from a primary device requesting a signature. The secondary device includes a touch receiving surface configured to receive touch input. The operations further include receiving, by the secondary device, an identifier generated by a sync server. The identifier identifies a private connection for exchanging data between the primary device and the secondary device. The operations further include displaying, by the secondary device, a web page corresponding to a universal record locator (URL) generated by the sync server, the web page comprising a region for entering a signature via touch input on the touch receiving surface. The operations further include receiving, by the secondary device, touch input on the touch receiving surface corresponding to at least portions of the signature. The operations further include sending, via the private connection, by the secondary device to the primary device, data points corresponding to at least portions of the signature received via touch input by the touch receiving surface.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The present disclosure will be more fully understood from the following detailed description taken in conjunction with the accompanying drawings, in which.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the disclosed technology is defined solely by the claims. The features illustrated or described in connection with one exemplary embodiment may be combined with the features of other embodiments. Such modifications and variations are intended to be included within the scope of the disclosed technology.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the size and shape of components with which the systems and devices will be used, and the methods and procedures in which the systems and devices will be used. Like reference symbols in the various drawings indicate like elements.

Figure 1:
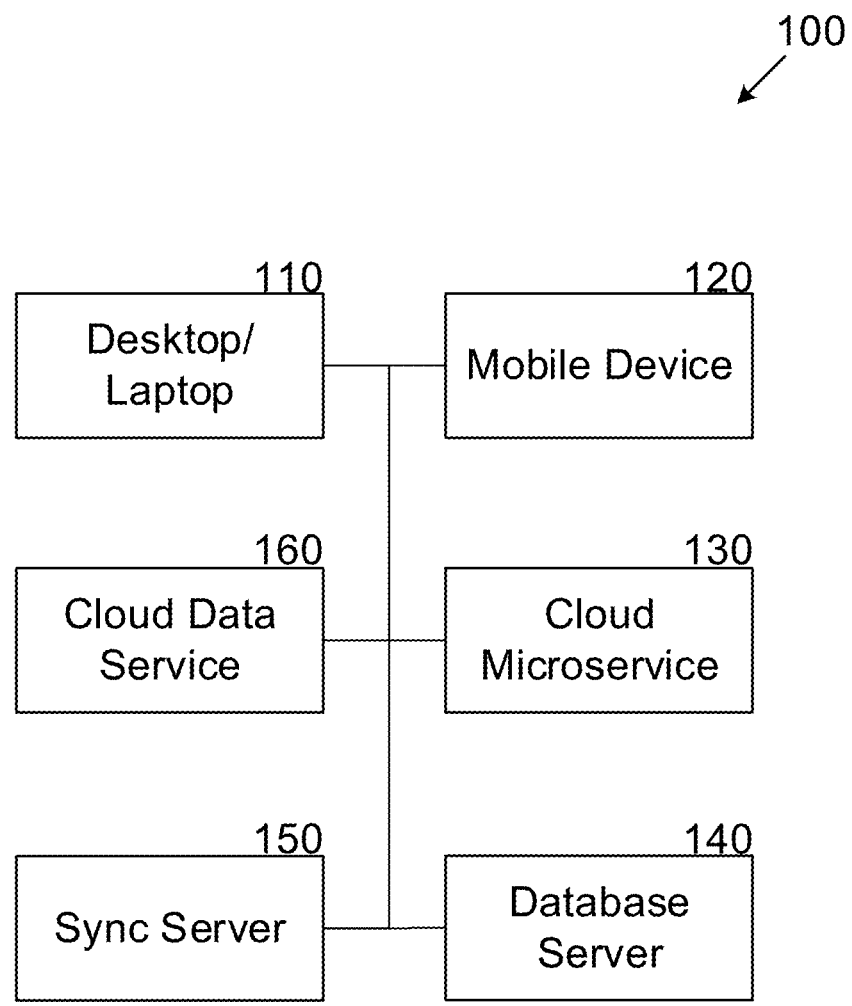
FIG. 1 is a system diagram of a system for securely acquiring a signature on a secondary device, such as a mobile phone, for use by a primary device, such as a desktop or laptop computer, for use in some example embodiments.

FIG. 1 is a system diagram of a system for securely acquiring a signature on a secondary device, such as a mobile phone, for use by a primary device, such as a desktop or laptop computer, for use in some example embodiments. The system 100 includes a client desktop/laptop 110, a mobile device 120, a cloud microservice 130, a database server 140, a sync server 150, and a cloud data service 160. The client desktop/laptop 110, the mobile device 120, the cloud microservice 160, the database server 140, the sync server 150, and the cloud data service 160 may be connected to each other via wired and/or wireless communication, such as one or more wide area networks (WAN) or the internet.

The client desktop or laptop 110 may be a commercially available desktop computer, laptop computer, or handheld computer. The client desktop or laptop 110 may include a keyboard, a mouse, and a display, but in various embodiments may lack an input device that enables a user to "write" her name, using her finger or a stylus, on a touch screen, touch pad, or other receiving surface.

In various embodiments, unlike the desktop/laptop 110 that does not include an input device that enables a user to "write" her name using a finger or stylus, the mobile device 120 may include a touch screen, touch pad, or other receiving surface for writing. Therefore, the mobile device 120, or other secondary device, may be used to acquire a signature for use by desktop/laptop 110, or other primary device. The mobile device 120 may be a smart phone, tablet, personal digital assistant, or other handheld or desktop device with an input device that enables a user to "write" using a finger or stylus. The stylus may be any stylus pen, a digital pen, or electronic pen that a user uses to draw, write, or input commands to a computer system. The user may sign her signature with the tip of her finger or a stylus, on a touch screen, touch pad, other receiving surface. The digital pen may be an accelerometer based digital pen, or an active pen that sends signals to the secondary device. The digital pen may use acceleration, position, pressure, or a camera to provide data for a signature in the form of a time series of position information corresponding to the signature. The touch screen, touch pad, or other receiving surface may use resistive, surface capacitive, projective capacitive, surface acoustic wave (SAW), infrared (IR), or other touch technologies to receive input from a user signing her name.

The cloud microservice 130 is a service operating on a computing device that, for example, may save a signature file and the associated user identification in a database server 140 or similar data storage system. The database server 140 that stores signatures and/or signature files may, for example, be include a PostgreSQL database that is hosted on AWS RDS (Relational Database Service).

The Sync Server 150 is a server that, for example, may create a randomly generated identifier that is used identify the session with a client. The sync server 150 may be a socket.io enabled web server. The sync server 150 may be hosted on a secure cloud services platform, for example AWS ECS (Amazon Web Services Elastic Container Service). The randomly generated identifier may be used as the private namespace to identify a private connection for exchanging data back and forth between the mobile device 120 and the desktop/laptop device 110.

The Sync Server 150 may create a URL and send it to the mobile device 120 via text message or similar messaging mechanism, using a service such as Twilio.

When the user on the mobile device 120 selects the URL, a web page is retrieved from the cloud data service 160, such as AWS S3 (Simple Storage Service), and displays to the user on the mobile device's 120 browser. The frontend portion of system 100 may be hosted via service such as AWS S3, AWS Cloudfront, and/or AWS Lambda services. These and other AWS services mentioned herein are illustrative examples. Various embodiments of the disclosed technology may use similar services from, for example, Microsoft Azure, Alibaba Cloud, Google Compute Engine, and/or IBM Cloud.

The user's signature may be displayed as a user signs her name, with, for example 10 ms, 20 ms, 40 ms, or 50 ms updates. Data points associated with the user signature may be transmitted from the secondary device to the primary device as the user signs her name, upon completion of signing, or only after the user approves the signature.

The user's signature may be verified by comparing the signature to at least one previously signed signature for that user.

Figure 2:
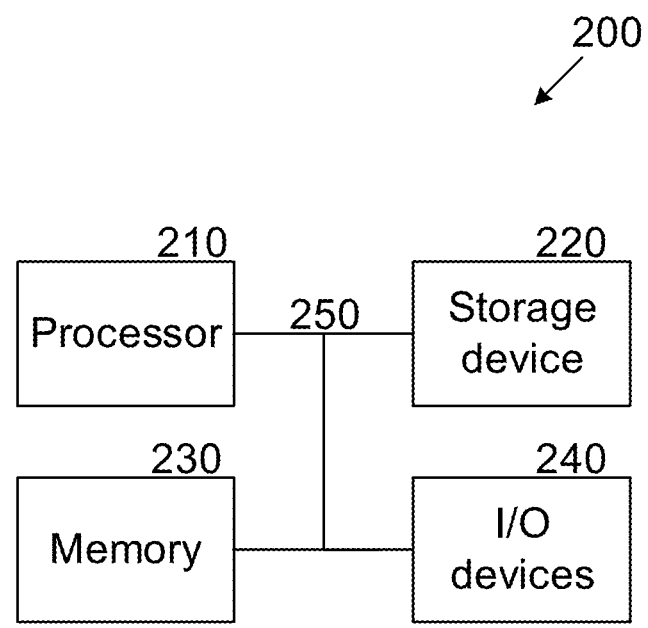
FIG. 2 depicts a system diagram illustrating a system for securely acquiring a signature on a secondary device, in accordance with some example embodiments.

FIG. 2 depicts a system diagram illustrating a system for securely acquiring a signature on a secondary device, in accordance with some example embodiments. For example, the desktop/laptop 110, the mobile device 120, the sync server 150, and the database server 140 may include a computing device 200. Similarly, the cloud microservice 130 and the cloud data service 160 may each be hosted on a computing device 200. The computing device 200 includes at least one processor 210, a storage device 220, memory 230, and input/output device 240. The at least one processor 210, a storage device 220, memory 230, and input/output device 240 may be interconnected via a system bus 250.

The at least one processor 210 is capable of processing instructions for execution within the computing system 200. The at least one processor 210 is capable of processing instructions stored in the memory 230 and/or on the storage device 220. The at least one processor 210 is capable of displaying graphical information for a user interface provided via the input/output device 240, for those computing systems 200 with a display.

The memory 230 is a computer readable medium such as volatile or non-volatile memory that stores information within the computing system 200. The storage device 220 is capable of providing persistent storage for the computing system 200. The storage device 220 may be a floppy disk device, a hard disk device, an optical disk device, or a tape device, or other suitable persistent storage means. The input/output device 240 provides input/output operations for the computing system 200. In some example embodiments, the input/output device 240 includes a keyboard, pointing device, and/or a device for acquiring written input. In various implementations, the input/output device 240 includes a display unit for displaying graphical user interfaces.

According to some example embodiments, the input/output device 240 may provide input/output operations for a network device. For example, the input/output device 240 may include Ethernet ports or other networking ports to communicate with one or more wired and/or wireless networks (e.g., a local area network (LAN), a wide area network (WAN), the Internet).

In some example embodiments, the computing system 200 may be used to execute various interactive computer software applications for acquiring a signature. Upon activation within the applications, the functionalities may be used to generate the user interface provided via the input/output device 240. The user interface may be generated and presented to a user by the computing system 200 (e.g., on a computer screen monitor, etc.).

Figure 3:
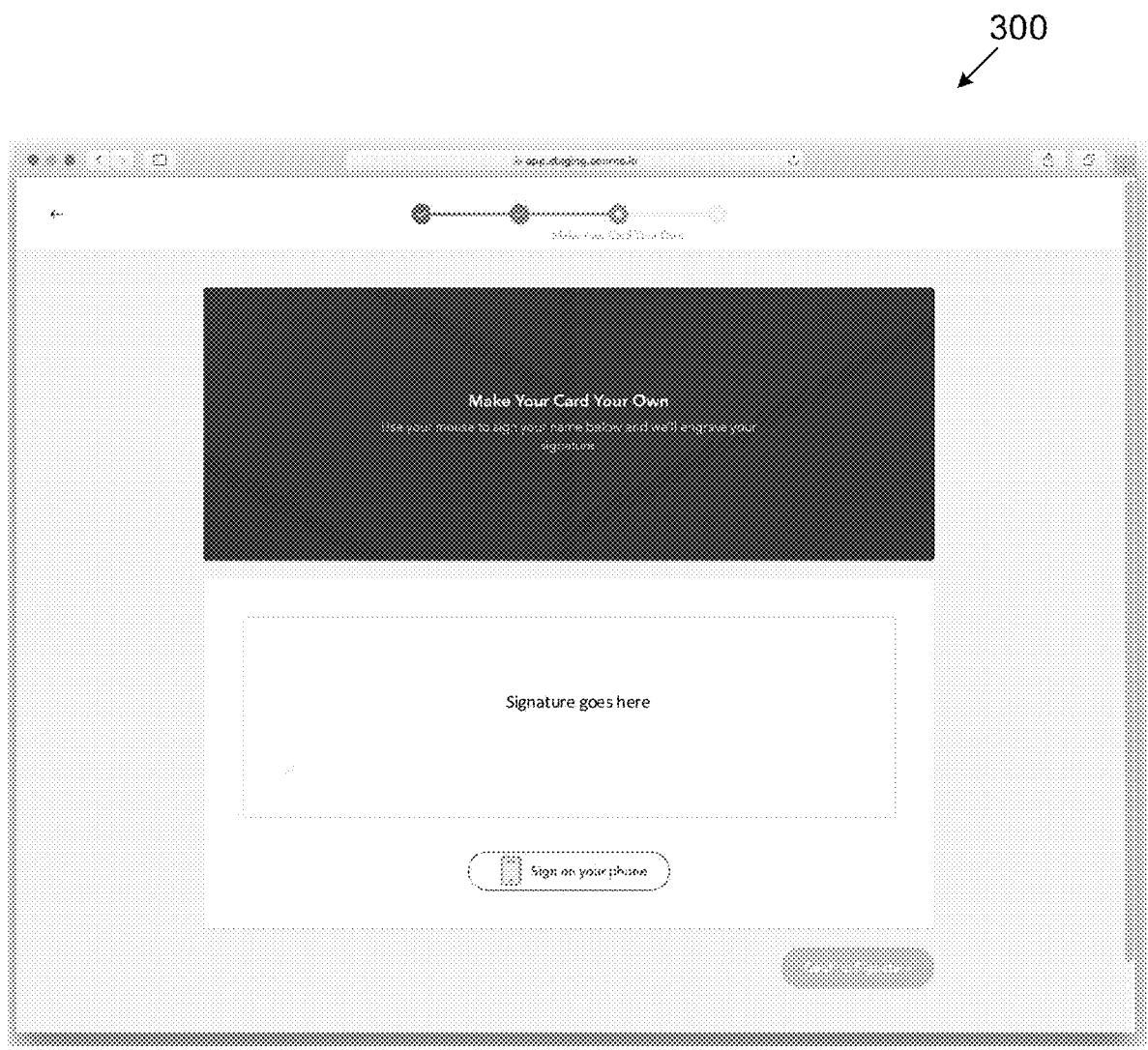
FIG. 3 shows an example of a screen displayed in a browser application in accordance with some example embodiments.

FIG. 3 shows an example of a screen 300 displayed in a browser application on the desktop/laptop 110. Display screen 300 asks the user to either sign her name with a mouse, or press a button to sign on her phone.

Figure 4:
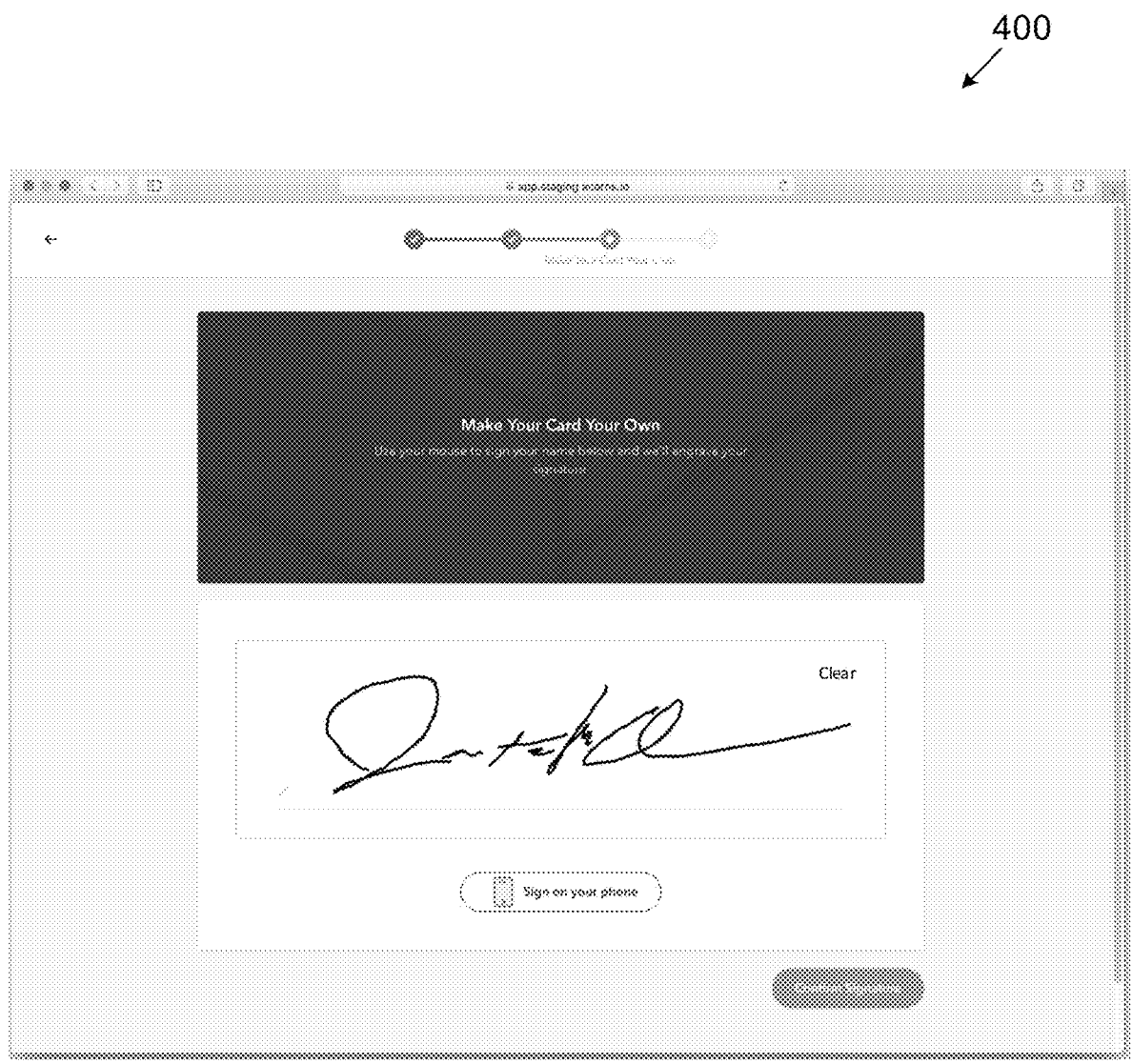
FIG. 4 shows an example of a screen displayed in a browser application with an example signature in accordance with some example embodiments.

FIG. 4 illustrates a screen 400 with a signature entered by a user using a mouse on the primary device, such as desktop/laptop 110. The signature is not as smooth as would be possible if the user signed with a finger or stylus.

Figure 5:
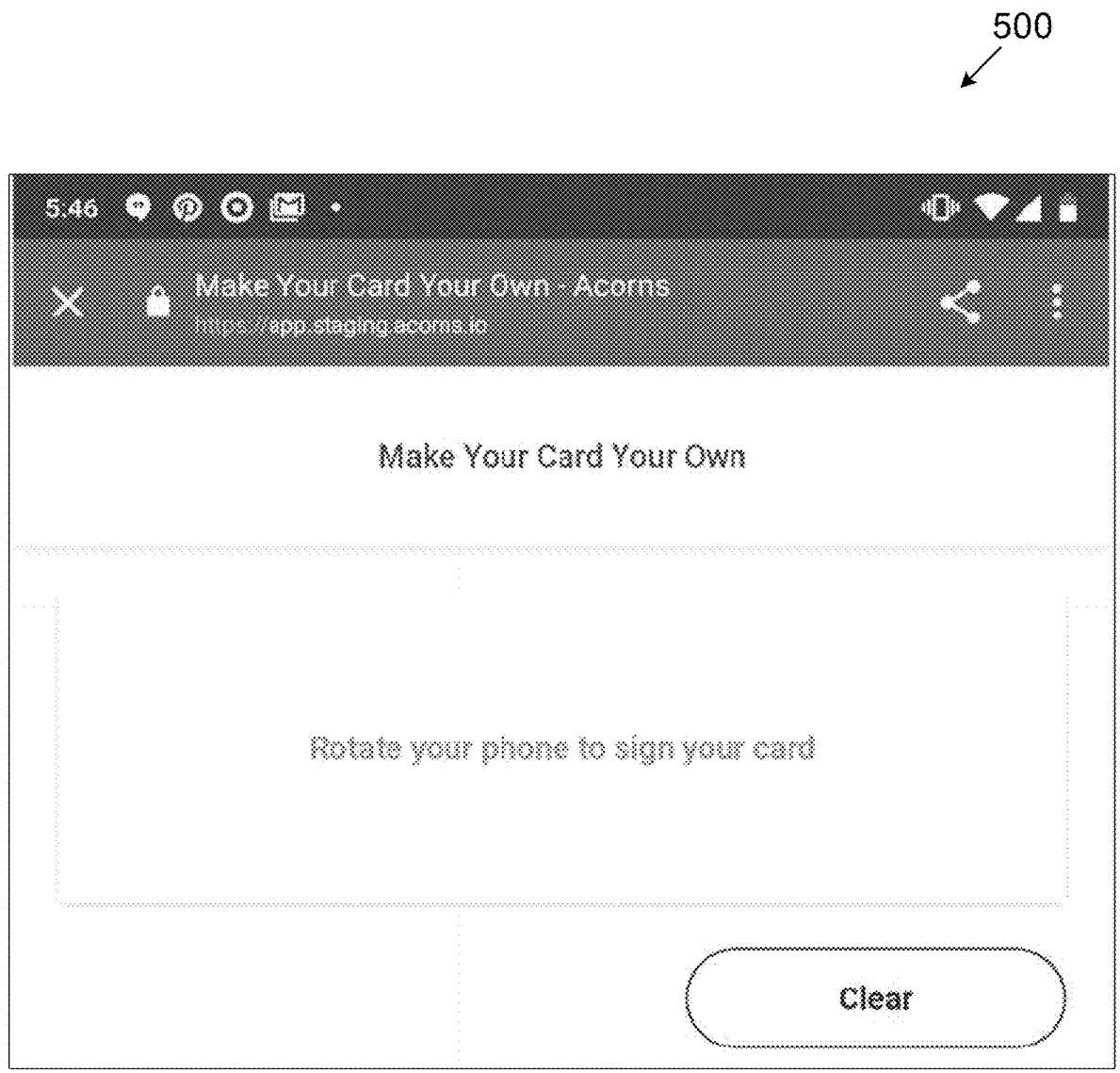
FIG. 5 shows an example of a screen displayed in a mobile application in portrait mode in accordance with some example embodiments.

FIG. 5 shows an example of a screen 500 displayed in a mobile application on the secondary device, such as mobile device 120, in after a user selected "sign on your phone" in the browser window of FIG. 3 on the primary device, such as the desktop/laptop 110. When the user selects the option to sign on her phone, the browser application first determines whether the user has registered a phone number with the browser application. If a phone number has not been registered, then the browser application prompts the user for a mobile phone number. If the user enters their phone number, the browser application transmits the phone number to the Sync Server 105 running in the cloud, using, for example, Amazon EC2.

The Sync Server 150 creates a randomly generated identifier that is used identify the session with the client. In a socket.io enabled web server, this randomly generated identifier is used as the private namespace to identify a private connection for exchanging data back and forth between the mobile and desktop/laptop device The Sync Server 150 creates a URL and sends it to the mobile device 120 via text message or similar messaging mechanism (eg. using a service such as Twilio)

When the user on the mobile device 120 selects the URL, a web page is retrieved from the cloud data service 160 (eg. Amazon S3) and displayed to the user on the mobile device's 120 browser in FIG. 5.

From the user's perspective, the browser application transmits a text message to the mobile device 120 associated with the phone number. The text message includes a URL that the user may select on her mobile phone (mobile device 120). When the user on the mobile device 120 selects the URL, a web page is retrieved from the cloud data service 160, such as Amazon S3, and displays the retrieved web page to the user on the mobile device's 120 browser, as shown in FIG. 5. Screen 500 is in portrait mode, and requests that a user rotates her phone for signing in landscape mode.

Figure 6:
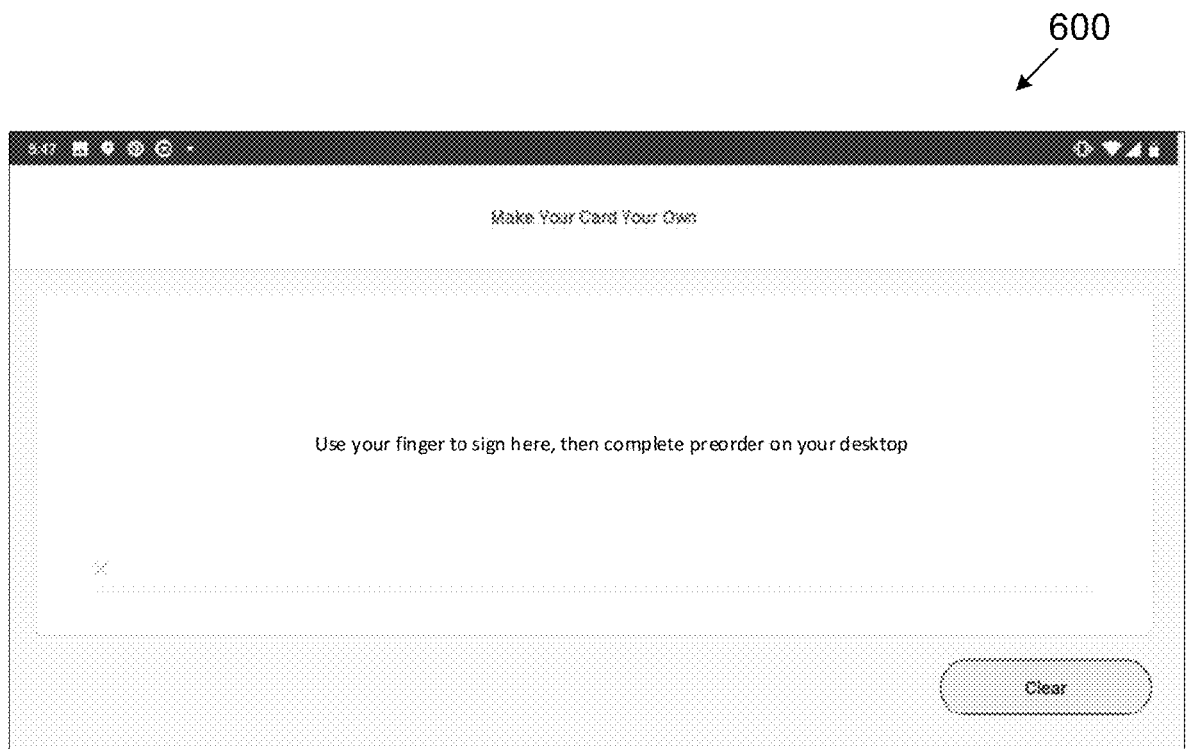
FIG. 6 shows an example of a screen displayed in a mobile application in landscape mode in accordance with some example embodiments.

FIG. 6 shows an example of a screen 600 displayed in a mobile application on the secondary device, such as mobile device 120, in landscape mode after a user rotated her phone as requested in screen 500 of FIG. 5, so that the user can sign her name. When the user starts signing on the mobile device 120, the data representing the user's drawing is sent every 40 ms via web sockets to the Sync Server 150 which then sends it to the desktop/laptop device 100, where it is scaled to the correct display size to match the desktop device, and displayed in real time. Note, if the user had previously signed on the desktop device, and then starts signing from the mobile device, the signature on the desktop device will be cleared before the new signature is displayed.

The web socket events on the Sync Server 150 are brokered by a service which exposes a small node.js web server which is enabled with socket.io.

Figure 7:
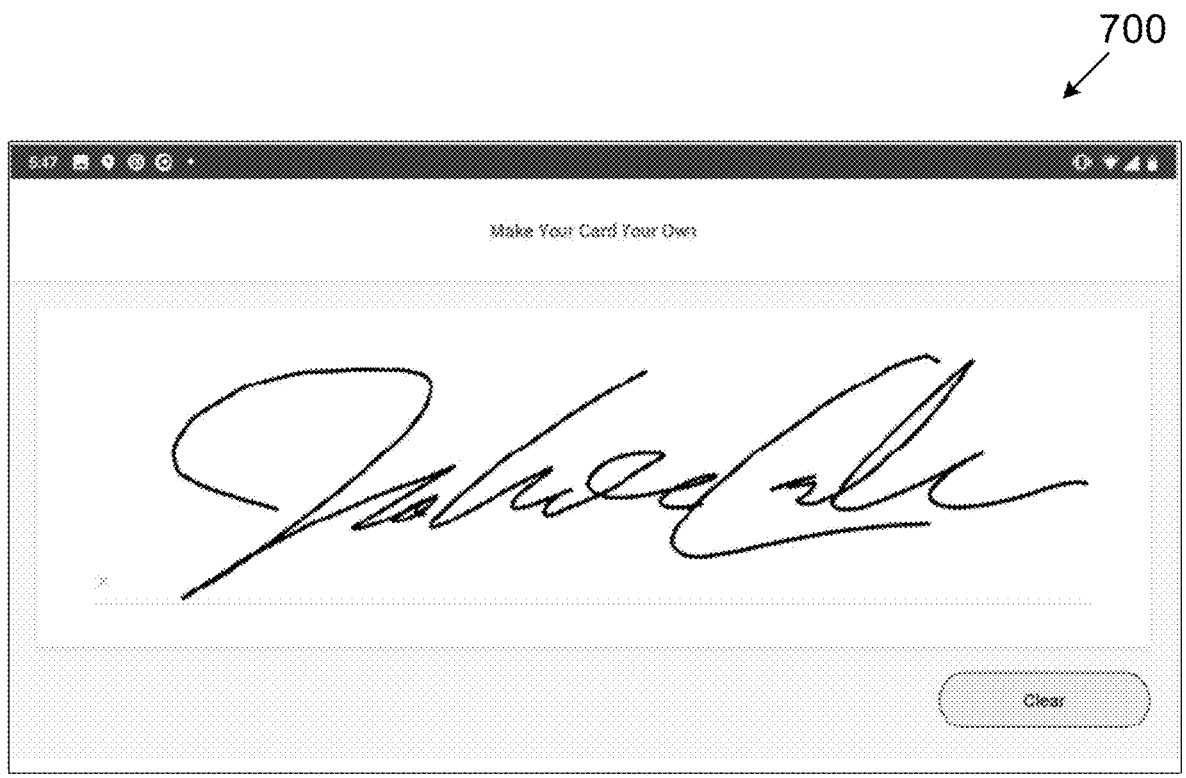
FIG. 7 shows an example of a screen displayed in a mobile application in landscape mode with an example signature in accordance with some example embodiments.

The data that is sent from the desktop device 110 is sent in chunks (or segments) of the signature to improve performance, rather than sending the entire signature every 40 ms FIG. 7 shows an example of a screen 700 displayed in a mobile application in landscape mode with an example signature, after the user signed her name on screen 600 on the secondary device, such as mobile device 120.

FIGS. 5-7 illustrate example "clear' buttons in the mobile application to be selected if the user wishes to clear a signature. If the user presses 'Clear' on the mobile device 120, at any time during the signing process, the signature is cleared on the mobile device 120 and the desktop device 110, using a message passed from the mobile device to the desktop/laptop device via the Sync Server 150.

Figure 8:
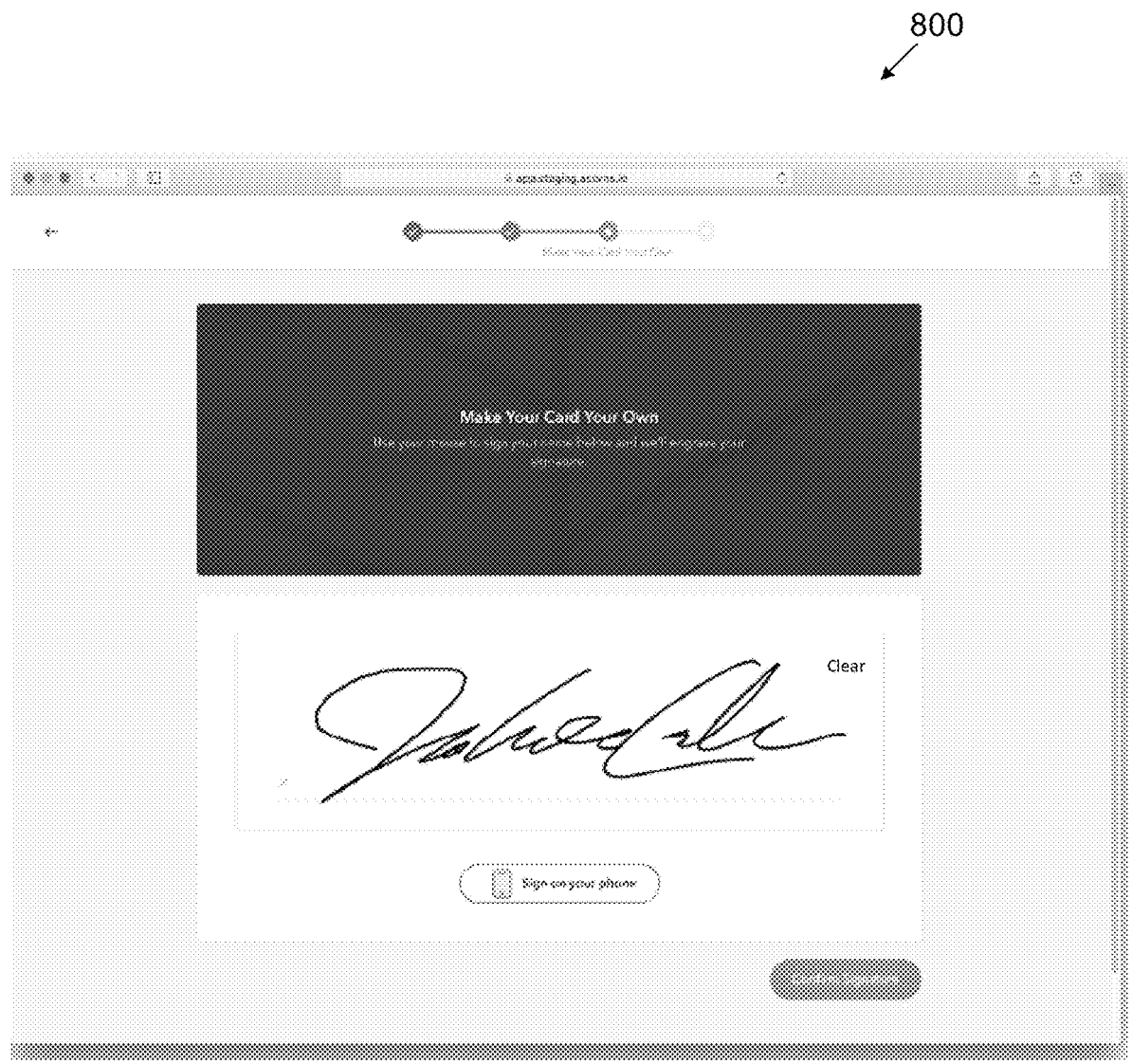
FIG. 8 shows an example of a screen displayed in a browser application with the example signature landscape mode with an example signature in accordance with some example embodiments.

FIG. 8 shows an example of a screen 800 displayed in a browser application on the primary device, such as desktop/laptop 110, including the signature signed by the user on the secondary device, such as mobile device 120. Once the user is done signing, the user returns to the desktop/laptop device to submit the form.

After the form is submitted, software running in the browser of the desktop/laptop device translates the data from the signature pad into the desired format (for example—SVG, bitmap, PNG) to generate a signature file.

The signature file is then sent from the browser on the desktop/laptop device to the cloud microservice 130, such as Amazon Lamba or Amazon EC2.

The cloud microservice 130 saves the signature file and the associated user identification on a database in database server 140 or similar data storage system.

FIGS. 4 and 8 illustrate example 'clear' buttons in the browser application to be selected if the user wishes to clear a signature. If the user presses 'Clear' in the browser application on the desktop device 110, at any time during the signing process, the signature is cleared on the desktop device 110 and on the mobile device 110, using a message passed from the desktop/laptop device to the mobile device via the Sync Server 150.

Figure 9:
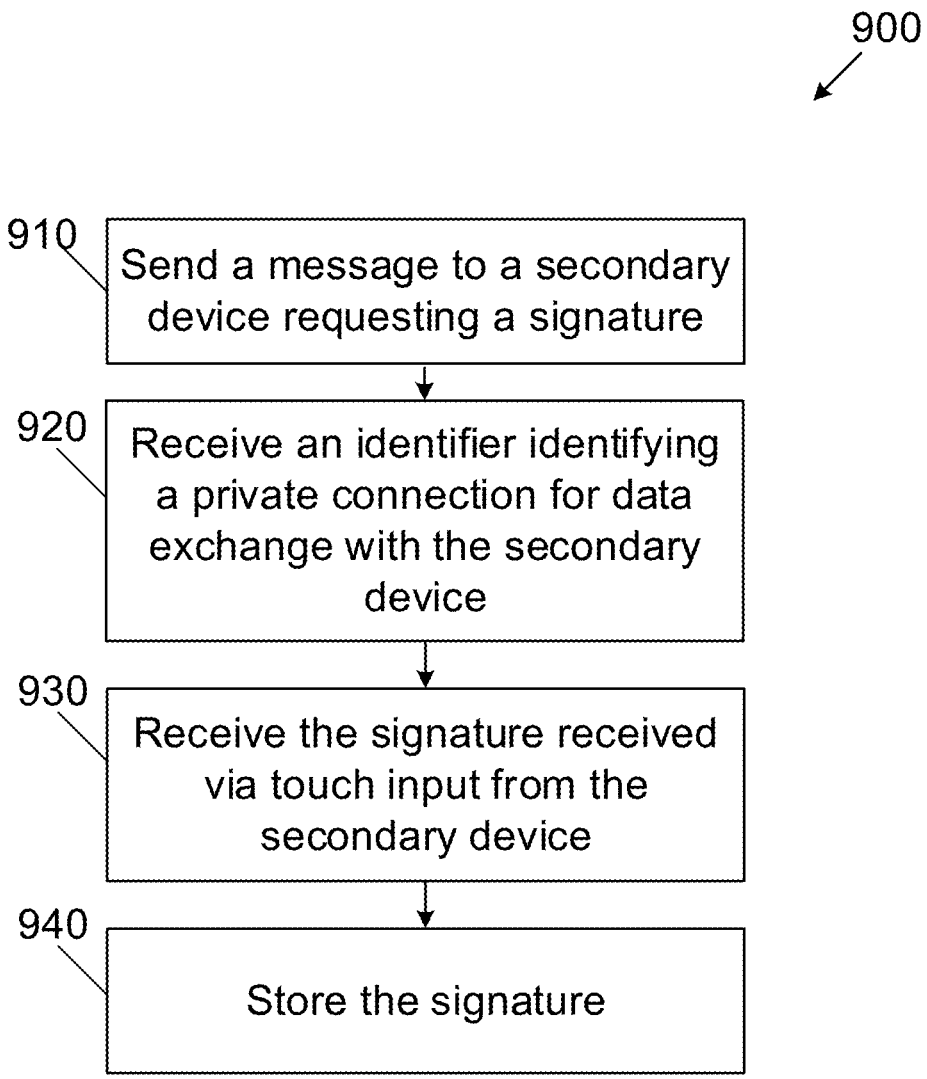
FIG. 9 is a flowchart of a process for acquiring a freehand or cursive signature signed on a secondary device.

FIG. 9 is a flowchart of a process 900 for acquiring a freehand or cursive signature signed on a secondary device. Referring to FIGS. 1A and 1B, the process 600 may be performed by the computing system 200 of a primary device, such as the desktop/laptop 110.

At 910, the desktop/laptop 110 sends a message to a secondary device, such as mobile device 120, requesting a signature. The secondary device includes a touch receiving surface configured to receive touch input.

At 920, the desktop/laptop 110 receives an identifier generated by a sync server 150. The identifier identifies a private connection for exchanging data between the primary device and the secondary device.

At 930, the desktop/laptop 110 receives, via the private connection, by from the secondary device, data points corresponding to at least portions of the signature received via touch input by the touch receiving surface on the secondary device.

At 940, the desktop/laptop 110 stores at least portions of the signature.

Figure 10:
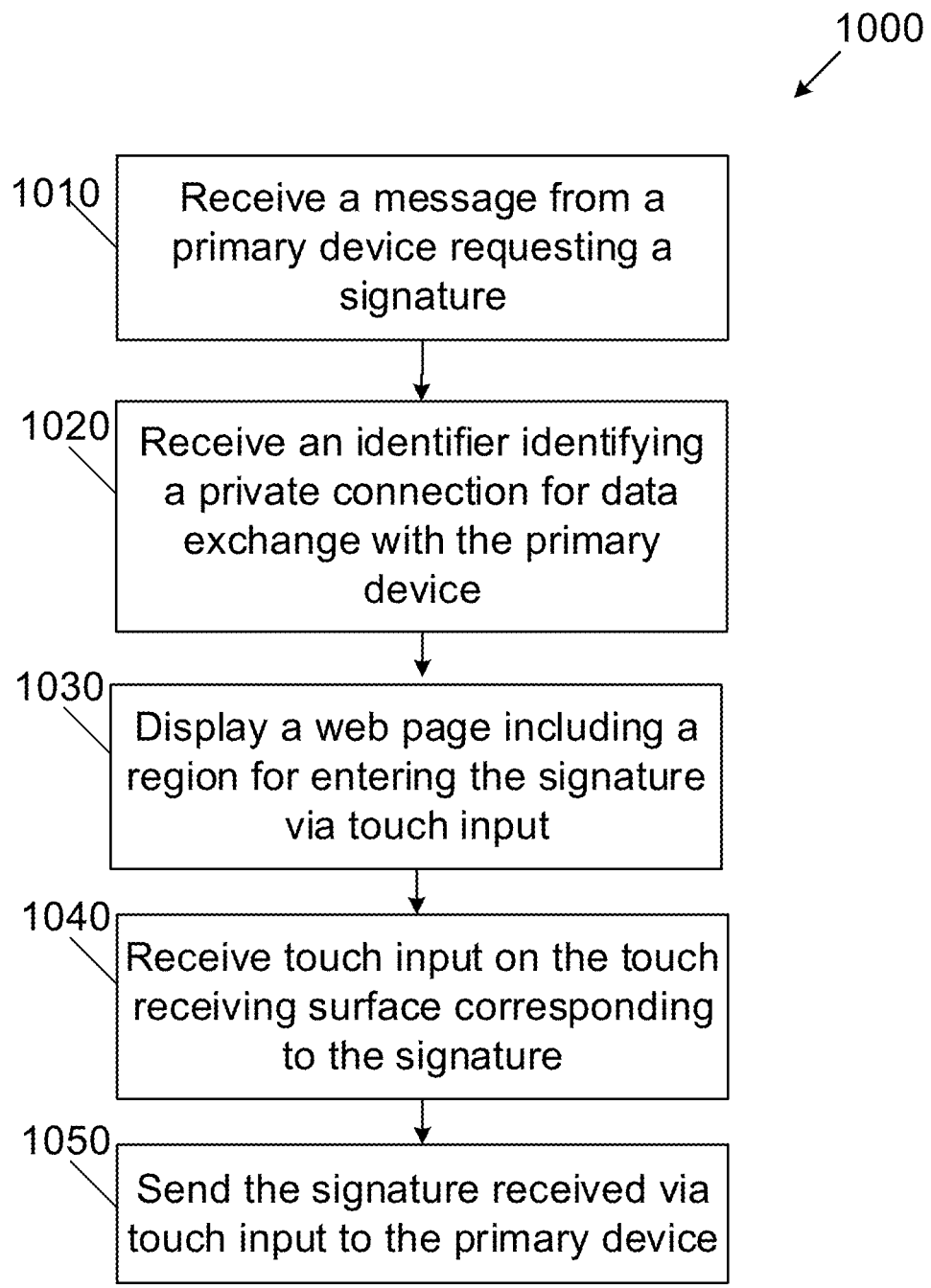
FIG. 10 is a flowchart of a process for acquiring a freehand or cursive signature signed on a secondary device.

FIG. 10 is a flowchart of a process 1000 for acquiring a freehand or cursive signature signed on a secondary device. Referring to FIGS. 1 and 2, the process 1000 may be performed by the computing system 200 of a secondary device, such as the mobile device 120.

At 1010, the mobile device 120 receives a message requesting a signature from a primary device, such as desktop/laptop 110. The secondary device includes a touch receiving surface configured to receive touch input.

At 1020, the mobile device 120 receives an identifier generated by a sync server. The identifier identifies a private connection for exchanging data between the primary device and the mobile device 120.

At 1030, the mobile device 120 displays a web page corresponding to a universal record locator (URL) generated by the sync server. The web page includes a region for entering a signature via touch input on the touch receiving surface;

At 1040, the mobile device 120 receives touch input on the touch receiving surface corresponding to at least portions of the signature.

At 1050, the mobile device 120 sends, via the private connection, to the primary device, data points corresponding to at least portions of the signature received via touch input by the touch receiving surface.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable computer hardware, which can be special or general purpose processor, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" one or more of may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   sending, by a primary device, a message to a secondary device requesting a signature, the secondary device comprising a touch receiving surface configured to receive touch input;
   receiving, by the primary device, an identifier generated by a sync server, the identifier identifying a private connection for exchanging data between the primary device and the secondary device;
   as the signature is being drawn by a user on the touch receiving surface of the secondary device, repeatedly, at each of a plurality of points in time that are each separated from an adjacent point of the plurality of points in time by a time interval that is less than or equal to 40 ms:
      receiving, via the private connection, by the primary device from the secondary device, updated data points corresponding to at least portions of the signature received via the touch input by the touch receiving surface by the secondary device since an immediately preceding point in time of the plurality of points in time;
      updating, at the primary device, a real time display of the signature as being drawn by the user on the touch receiving surface of the secondary device such that the portions of the signature received by the primary device are displayed on a screen of the primary device incrementally in accordance with the time interval as the user interacts with the touch receiving surface of the secondary device;
   subsequent to receiving a full signature from the secondary device, generating a signature file at the primary device based on each of the updated data points collectively received over the plurality of points in time; and
   storing, by the primary device, the signature file.

2. The method of claim 1, wherein sending the message to the secondary device comprises sending the message via a text message, in response to determining that the user has registered a phone number associated with the secondary device with a browser running on the primary device, the browser configured for receiving the phone number and sending the text message to the secondary device over the sync server which uses the phone number and a randomly generated identifier to establish the private connection for exchanging the data between the primary device and the secondary device.

3. The method of claim 1, further comprising validating the received at least portions of the signature by comparing the received at least portions of the signature to a previously signed signature.

4. The method of claim 1, further comprising receiving, via the private connection, by the primary device from the secondary device, a confirmation of a signature message.

5. The method of claim 1, further comprising receiving, via the private connection, by the primary device from the secondary device, a clear signature message in response to a user selection of a clear button displayed by the secondary device.

6. A non-transitory computer program product storing instructions that, when executed by at least one programmable processor, cause the at least one programmable processor to perform operations comprising:
   sending, by a primary device, a message to a secondary device requesting a signature, the secondary device comprising a touch receiving surface configured to receive touch input;
   receiving, by the primary device, an identifier generated by a sync server, the identifier identifying a private connection for exchanging data between the primary device and the secondary device;
   as the signature is being drawn by a user on the touch receiving surface of the secondary device, repeatedly, at each of a plurality of points in time that are each separated from an adjacent point of the plurality of points in time by a time interval that is less than or equal to 50 ms:
- receiving, via the private connection, by the primary device from the secondary device, updated data points corresponding to at least portions of the signature received via the touch input by the touch receiving surface by the secondary device since an immediately preceding point in time of the plurality of points in time;
- updating, at the primary device, a real time display of the signature as being drawn on the secondary device such that the portions of the signature are received by the primary device and are displayed on a screen of the primary device incrementally in accordance with the time interval as a user interacts with the touch receiving surface of the secondary device; and
- subsequent to receiving a full signature from the secondary device, generating a signature file at the primary device based on each of the updated data points collectively received over the plurality of points in time.

7. A computing system comprising:
memory; and
a processor in communication with the memory and configured with executable instructions to perform operations comprising:
- sending a message to a secondary device requesting a signature, the secondary device comprising a touch receiving surface configured to receive touch input;
- receiving, by the computing system, an identifier generated by a sync server, the identifier identifying a private connection for exchanging data between the computing system and the secondary device;
- as the signature is being drawn by a user on the touch receiving surface of the secondary device, repeatedly, at each of a plurality of points in time that are each separated from an adjacent point of the plurality of points in time by a time interval that is less than or equal to 50 ms:
  - receiving, via the private connection, by the computing system from the secondary device, updated data points corresponding to at least portions of the signature received via the touch input by the touch receiving surface by the secondary device since an immediately preceding point in time of the plurality of points in time;
  - updating, at the computing system, a real time display of the signature as being drawn by the user on the touch receiving surface of the secondary device such that the portions of the signature received by the computing system are displayed on a screen of the computing system incrementally in accordance with the time interval as the user interacts with the touch receiving surface of the secondary device;
- subsequent to receiving a full signature from the secondary device, generating a signature file at the computing system based on each of the updated data points collectively received over the plurality of points in time; and
- storing, by the computing system, the signature file.

8. The computing system of claim 7, wherein the updated data points are transmitted at less than 40 ms via one or more web sockets of the sync server.

9. The computing system of claim 7, wherein the updated data points are transmitted at 40 ms via one or more web sockets of the sync server.

10. The computing system of claim 7, wherein a resulting signature drawn from the data points is scaled in real time to conform to a display size of the screen of the computing system as the data points incrementally appear on the display.

* * * * *